United States Patent

Kaplan et al.

[11] Patent Number: 5,940,751
[45] Date of Patent: Aug. 17, 1999

[54] SYSTEM AND METHOD FOR DETECTION OF FRAUD IN A WIRELESS TELEPHONE SYSTEM

[75] Inventors: Dmitry Kaplan, Bellevue; Chetan Sharma, MountLake Terrace, both of Wash.

[73] Assignee: Cellular Technical Services Company, Inc., Seattle, Wash.

[21] Appl. No.: 08/669,773

[22] Filed: Jun. 27, 1996

[51] Int. Cl.⁶ ................................................. H04Q 7/20
[52] U.S. Cl. .................. 455/411; 455/411; 455/410; 455/408; 455/405
[58] Field of Search ................................ 455/411, 410, 455/408, 405

[56] References Cited

U.S. PATENT DOCUMENTS

| | | | |
|---|---|---|---|
| 4,800,387 | 1/1989 | Joy | 342/165 |
| 4,843,562 | 6/1989 | Kenyon et al. | 364/487 |
| 4,955,049 | 9/1990 | Ghisler | 379/58 |
| 5,005,210 | 4/1991 | Ferrell | 455/115 |
| 5,091,942 | 2/1992 | Dent | 380/46 |
| 5,222,140 | 6/1993 | Beller et al. | 380/30 |
| 5,237,612 | 8/1993 | Raith | 380/23 |
| 5,239,294 | 8/1993 | Flanders ete al. | 340/825.34 |
| 5,241,598 | 8/1993 | Raith | 380/21 |
| 5,282,250 | 1/1994 | Dent et al. | 380/23 |
| 5,299,263 | 3/1994 | Beller et al. | 380/30 |
| 5,303,285 | 4/1994 | Kerihuel et al. | 379/58 |
| 5,309,501 | 5/1994 | Kozik et al. | 379/58 |
| 5,315,636 | 5/1994 | Patel | 379/58 |
| 5,319,699 | 6/1994 | Kerihuel et al. | 379/58 |
| 5,329,591 | 7/1994 | Magrill | 380/25 |
| 5,335,265 | 8/1994 | Cooper et al. | 379/59 |
| 5,335,278 | 8/1994 | Matchett et al. | 380/23 |
| 5,345,595 | 9/1994 | Johnson et al. | 455/33.1 |
| 5,390,245 | 2/1995 | Dent et al. | 380/23 |
| 5,392,355 | 2/1995 | Khurana et al. | 380/23 |
| 5,392,356 | 2/1995 | Konno et al. | 380/23 |
| 5,420,908 | 5/1995 | Hodges et al. | 379/58 |
| 5,420,910 | 5/1995 | Rudokas et al. | 479/59 |
| 5,448,760 | 9/1995 | Frederick | 455/56.1 |
| 5,455,863 | 10/1995 | Brown et al. | 380/23 |
| 5,465,387 | 11/1995 | Makherjee | 455/26.1 |
| 5,467,382 | 11/1995 | Schorman | 379/58 |
| 5,488,649 | 1/1996 | Schellinger | 379/62 |
| 5,509,075 | 4/1996 | Grube et al. | 380/23 |
| 5,517,554 | 5/1996 | Mitchell et al. | 379/59 |
| 5,517,555 | 5/1996 | Amadon et al. | 379/59 |
| 5,517,568 | 5/1996 | Grube et al. | 380/23 |
| 5,535,431 | 6/1996 | Grube et al. | 455/411 |
| 5,537,474 | 7/1996 | Brown et al. | 380/23 |
| 5,541,977 | 7/1996 | Hodges et al. | 379/58 |
| 5,548,636 | 8/1996 | Bannister et al. | 379/201 |
| 5,551,073 | 8/1996 | Sammarco | 455/89 |
| 5,555,192 | 9/1996 | Grube et al. | 455/411 |
| 5,555,551 | 9/1996 | Rudokas et al. | 379/59 |
| 5,625,869 | 4/1997 | Nagamatsu et al. | 455/411 |
| 5,633,914 | 5/1997 | Rosa | 455/411 |
| 5,655,004 | 8/1997 | Holbrook | 455/411 |
| 5,715,518 | 2/1998 | Barrere et al. | 455/49.1 |
| 5,748,722 | 5/1998 | Lee | 379/160 |
| 5,770,846 | 6/1998 | Mos et al. | 1235/440 |

*Primary Examiner*—Wellington Chin
*Assistant Examiner*—Senai Kibreab
*Attorney, Agent, or Firm*—Seed and Berry LLP

[57] ABSTRACT

A system for the detection of fraudulent use of a wireless telephone system includes a signature analyzer to analyze the transmission characteristic of an unauthenticated transmitter. If the system authenticates the transmitter, based on stored records, the system establishes a customer call profile, based on the geographical location of the wireless telephone at the time of the calls, as well as a time period in which the communication occurs. The system uses these records to establish a customer call profile. The system analyzes a subsequent call and the customer call profile to designate the subsequent call as valid or invalid. The system overrides the decision of the signature analyzer that a particular unauthenticated wireless telephone is fraudulent if the values for call parameters of the subsequent call are sufficiently close to the corresponding parameter values in the customer call profile. The system is adaptive in that old call data records are periodically deleted, thus allowing their replacement with newer call data records.

32 Claims, 7 Drawing Sheets

SYSTEM AND METHOD FOR DETECTION OF FRAUD IN A WIRELESS TELEPHONE SYSTEM

DESCRIPTION

1. Technical Field

The present invention relates generally to cellular telephone operation, and, more particularly, to a system and method for the detection of fraud in a cellular telephone system.

2. Background of the Invention

In a communications network, it is often desirable to identify and distinguish one transmitter from other transmitters operating within the network. For example, in the wireless telephone industry, a cellular telephone system utilizes an electronic serial number (ESN) and a mobile telephone identification number (MIN) to provide a unique identification for each transmitter. When an individual subscriber or other authorized user of a particular cellular telephone wishes to place a phone call, he dials in a telephone number and presses the "Send" button. In response, his cellular telephone transmits its ESN and MIN to the cellular network so that the individual subscriber can be charged for the telephone call.

Unfortunately, unscrupulous individuals illegally operate cellular telephones by counterfeiting the ESN and MIN of a valid subscriber's telephone in order to obtain illegal access to the cellular network without paying for the service. The ESN and MIN of a cellular telephone can be obtained by a counterfeiter electronically monitoring the initial transmission of the telephone, and then programming the detected ESN and MIN into another telephone for illegal use. Thus, the use of ESN and MIN is by itself inadequate to protect a cellular telephone system from misuse by counterfeiters. When a cellular telephone initiates a call, it transmits its ESN and MIN as an identification. While the cellular telephone is identified by its ESN and MIN, it cannot be considered as an authorized cellular telephone because it is not known whether the ESN and MIN have been transmitted by the authorized cellular telephone or a fraudulent cellular telephone. For purposes of the present description a cellular telephone identified on the basis of the transmitted ESN and MIN is designated as an unauthenticated cellular telephone until it is determined to be an authorized cellular telephone or a fraudulent cellular telephone.

In an effort to provide additional security, some cellular systems and other wireless services, authenticate mobile units based on the radio frequency (RF) transmission of data by the mobile unit during a call set-up process. Rather than identify the mobile unit by its ESN and MIN alone, the system identifies a cellular telephone by its transmission characteristics. In this manner, the cellular system operator can reject calls from fraudulent cellular telephones even when those cellular telephones transmit valid ESN and MIN numbers. For example, in U.S. Pat. No. 5,005,210 issued to Ferrell on Apr. 2, 1991 ("the Ferrell patent"), a system is described that analyzes certain transmitter characteristics in an effort to identify the transmitter type. The system in the Ferrell patent analyzes the manner in which the modulator makes a transition to the designated carrier frequency. This transient response is used to identify the type of transmitter.

While the Ferrell patent describes one class of transmission characteristics that can be used as a fingerprint, other transmission characteristics are also known in the art. For example, U.S. Pat. No. 5,420,910 issued to Rudokas et al. on May 30, 1995 ("the Rudokas patent"), describes an identifier, such as a radio frequency signature, that can be used to positively identify an authorized cellular telephone or a known fraudulent telephone. Other types of signature authentication systems are also known in the art and need not be described herein. These transmission characteristics, from whatever source they are derived, can be processed in different manners to create a "fingerprint" of the individual transmitter. The analogy with fingerprints is used because each transmitter fingerprint is believed to be completely unique. The transmitter fingerprint can be used to determine whether the transmission characteristics of the unauthenticated transmitter match the stored fingerprint of the authorized transmitter corresponding to the transmitted ESN and MIN. In such manner, the fingerprint is used with cellular telephone calls to authenticate the transmitting cellular telephone.

Fingerprint authentication systems all require at least one transmission characteristic waveform, known to be generated by the authentic cellular telephone, to be used as a reference waveform for the fingerprint authentication system. Some systems may rely more than one reference waveforms to generate the fingerprint. One drawback of these fingerprint authentication systems is that a substantial amount of data processing time may be required to establish the fingerprint. However, this data processing is not time dependent and may be performed over a period of time.

In contrast, the process of comparing the transmission characteristic of the unauthenticated transmitter with the stored fingerprint must be performed in real-time and quickly to effectively deny or terminate fraudulent calls. This can place difficult demands on a fingerprint system's processing capabilities during peak calling periods. Some existing cellular telephone systems use analysis techniques that are not real time. In those systems, if a call is subsequently determined to be fraudulent, the destination telephone number is added to a list of known fraudulent numbers. The cellular telephone system checks the list of known fraudulent numbers to prevent any subsequent telephone calls from being placed to a known fraudulent number.

No fingerprint analysis system is 100% effective. Thus, it is possible that a fraudulent cellular telephone will be identified as an authorized cellular telephone. Conversely, it is possible that an authorized cellular telephone will be identified as fraudulent. While the former misidentification may result in incorrect charges to the customer, and the resulting loss of revenues to the service provider, the latter misidentification is of particular concern to service providers. Specifically, service providers do not wish to inconvenience the customer and disrupt valid calls due to the misidentification of an authorized cellular telephone as fraudulent.

Therefore, it can be appreciated that there is a significant need for a system and method for detection of fraud using characteristics other than a fingerprint waveform analysis thus preventing overloading of a cellular telephone fingerprint system's processing capabilities. The present invention provides this and other advantages as will be illustrated by the following description and accompanying figures.

SUMMARY OF THE INVENTION

The present invention is embodied in a system and method for processing wireless telephone communications. The system includes a signature analyzer to classify an unauthenticated wireless telephone as authorized or fraudulent based on a transmission characteristic of the unauthenticated wireless telephone in a wireless communication with the unauthenticated wireless telephone. The system also includes a parameter data storage area to store data values for one or more parameters associated with each of the plurality of different communications with a particular wireless telephone designated by the signature analyzer as an authorized wireless telephone. The system further includes a decision engine to analyze a communication with an unauthenticated wireless telephone classified by the signature analyzer as fraudulent at a time subsequent to the plurality of different communications with the authorized wireless telephone. The decision engine designates the subsequent communication as valid based on the signature analyzer classification and the parameter data storage area.

The system can store a place of origin of the authorized wireless telephone during each of the plurality of communications in the parameter data storage area as data values for one of the parameters associated with the authorized wireless telephone. The decision engine can designate the subsequent communication as valid based on a place of origin of the unauthenticated wireless telephone during the subsequent communication and the stored places of origin of data values. In one embodiment, the system is used with a cellular telephone system having a plurality of cells, wherein the place of origin of each of the plurality of communications with the authorized wireless telephone are stored as cell identifiers data values of cells within the cellular telephone system. The decision engine designates the subsequent communication as valid based on a location of origin of the unauthenticated wireless telephone during the subsequent communication and the stored cell places of origin data values.

The system may also include a timer to determine a time period associated with each of the plurality of communications with the authorized wireless telephone. With a time period of each of these plurality of different communications being stored in the parameter data storage area as data values for one of the parameters associated with the authorized wireless telephone. The decision engine designates the subsequent communication as valid based on a time period associated with the subsequent communication with the unauthenticated wireless telephone and the stored time period data values.

The decision engine may also calculate a confidence value for the subsequent communication with the unauthenticated wireless telephone and designates the subsequent communication as valid if the calculated confidence value exceeds a predetermined threshold value. The confidence value may be based on the frequency with which the parameter value associated with the subsequent communication matches data values in the parameter data storage area associated with the authorized wireless telephone. The selected threshold may also be varied depending on the analysis of the transmission characteristic by the signature analyzer. The signature analyzer compares the transmission characteristic with a stored transmission characteristic from the authorized wireless telephone. The predetermined threshold value may shift depending on the degree to which the transmission characteristic of the unauthenticated wireless telephone matches the stored transmission characteristic.

The system is also adaptive in that it can periodically be updated to store new data for the one or more parameters associated with the authorized wireless telephone. The decision engine uses the new data to designate the subsequent communication as valid. The system may periodically update the parameter data storage area by deleting a predetermined number of stored data entries and replacing the deleted data entries with new data for the one or more parameters associated with the authorized wireless telephone.

DETAILED DESCRIPTION OF THE INVENTION

Figure 1:
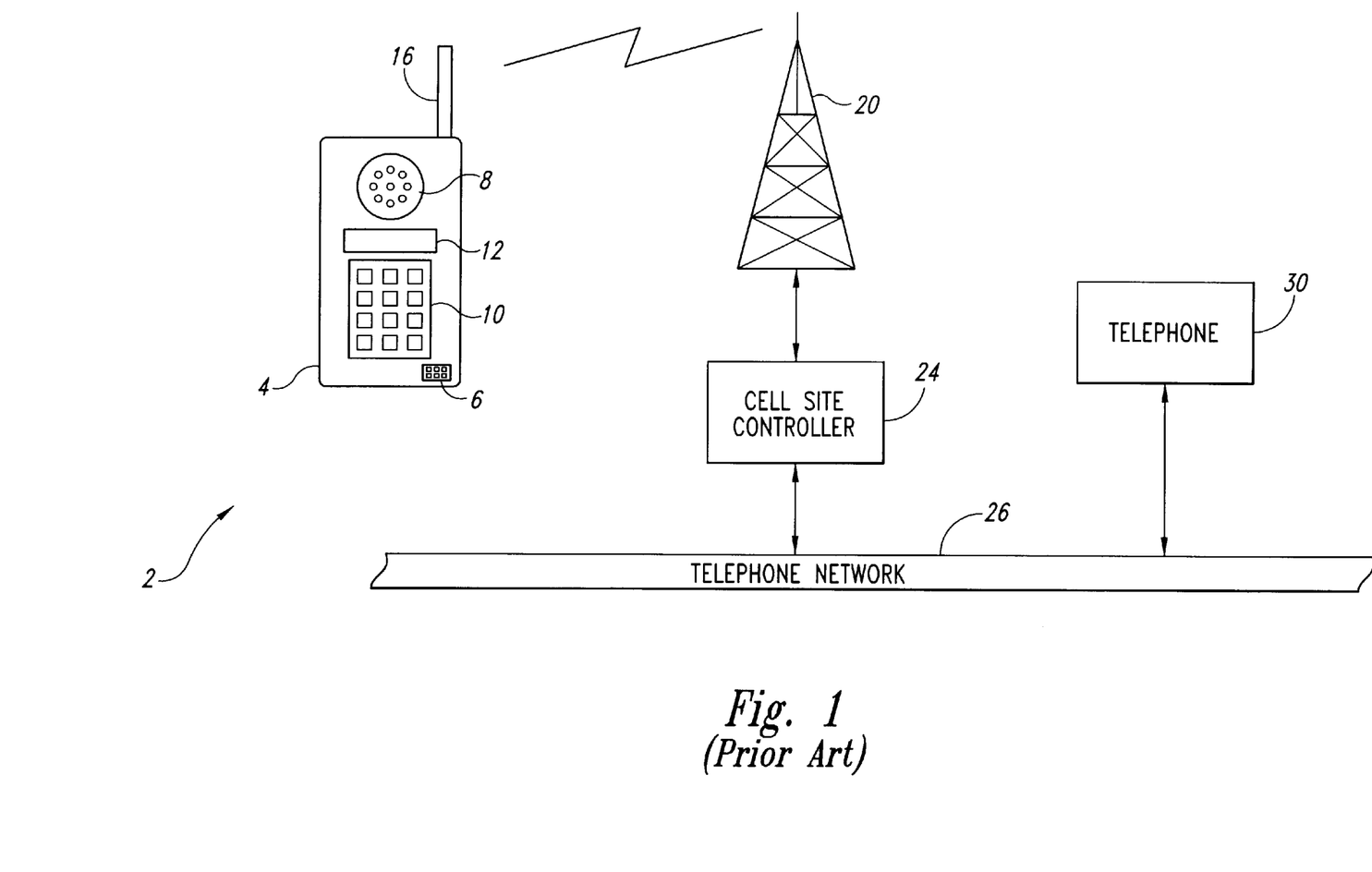
FIG. 1 illustrates the operation of a conventional cellular telephone system.
Figure 2:
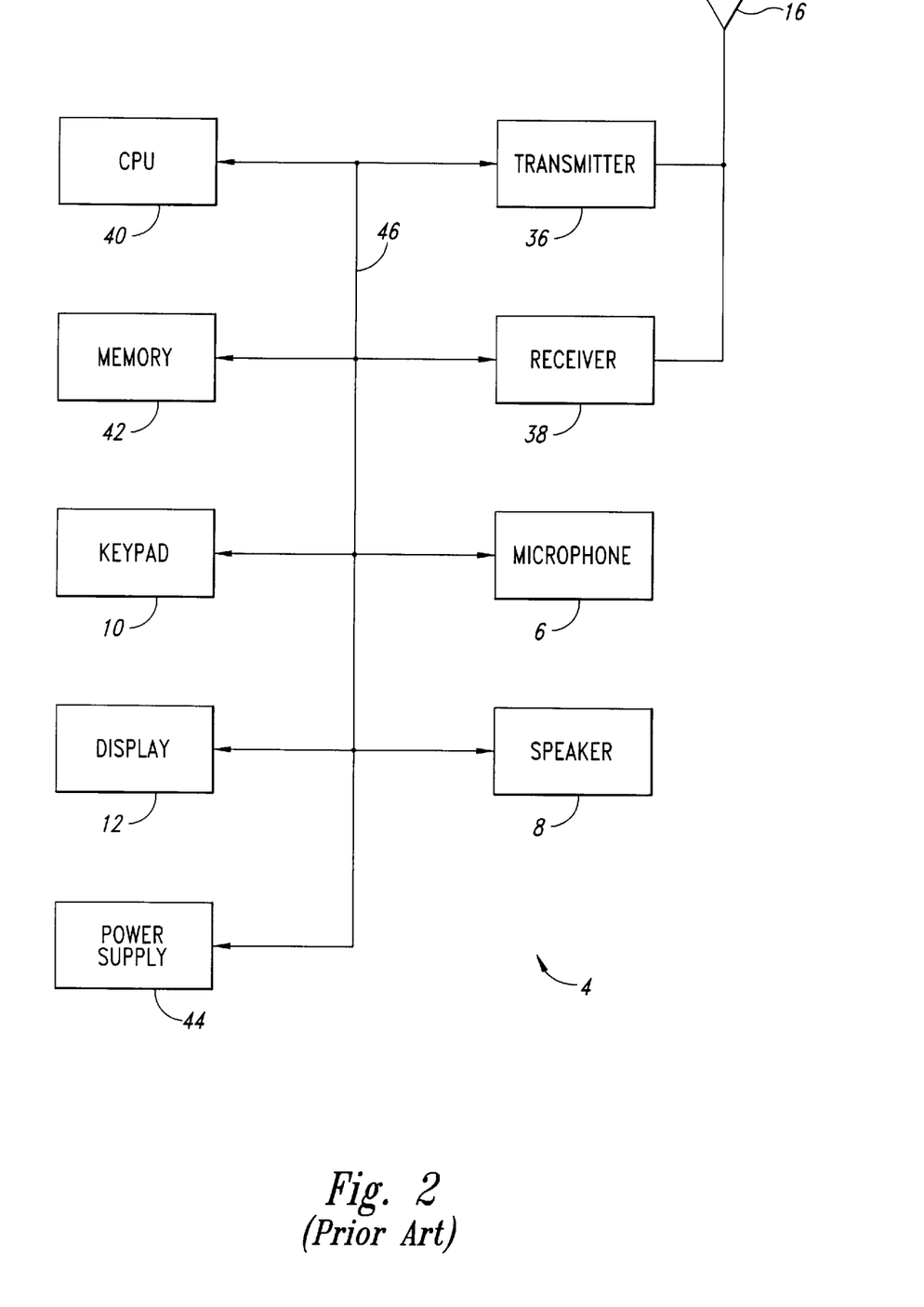
FIG. 2 is a finctional block diagram of the conventional cellular telephone of FIG. 1.

For a more complete understanding of the present invention, the operation of a wireless-cellular telephone system will be briefly discussed. Although the discussion that follows is directed to cellular telephones, it should be clearly understood that the invention can be used with wireless telephone devices that may transmit voice such as cellular telephones or data such as data modems. The term telephone as used herein is intended to include devices for wireless voice and data communication. A conventional cellular telephone system 2 is illustrated in FIG. 1. An individual cellular telephone 4 has a microphone 6 and a speaker 8, as well as a keypad and a display 12.

Transmitter and receiver circuits (see FIG. 2) within the cellular telephone 4 communicate via a cellular telephone antenna 16 to a cell site antenna 20 at a frequency typically in the 800 megahertz (MHz) frequency range. The signal received by the cell site antenna 20 is coupled to a cell site controller 24. The cell site controller 24 determines the authenticity of the ESN and MIN transmitted by the cellular telephone 4 at the beginning of a cellular telephone call, as well as the telephone number being called by the cellular telephone 4. The cell site controller 24 couples the cellular telephone 4 to a conventional telephone network 26. Also coupled to the telephone network 26 is a telephone 30 to which the cellular telephone 4 is placing a call. In this manner, the cellular telephone 4 can communicate with the telephone 30. Similarly, the telephone 30 may place a call to the cellular telephone 4 in the reverse manner described above. The telephone 30 is illustrated in FIG. 1 as connected directly to the telephone network 26. However, those skilled in the art will recognize that the telephone 30 could be another cellular telephone coupled to the cell site controller 24 by the cell site antenna 20, or another cell site controller and antenna (not shown).

The conventional cellular telephone 4 is illustrated in the functional block diagram of FIG. 2. The antenna 16 is coupled to a transmitter 36 and a receiver 38. The microphone 6, speaker 8, keypad 10, and display 12 are conventional components that need not be described in any greater detail. The cellular telephone 4 also includes a central processing unit (CPU) 40, which may be an embedded controller, conventional microprocessor, or the like. In addition, the cellular telephone 4 includes a memory 42, which may include both random access memory (RAM) and read-only memory (ROM). The cellular telephone 4 also includes a power supply 44, which includes a battery (not shown) for internal power and a power supply connector (not shown). For the sake of clarity, other conventional components, such as the modulator, demodulator, and local oscillator have been omitted. The various components described above are coupled together by a bus 46. For the sake of clarity, the bus 46 is illustrated as coupling all components together. However, those skilled in the art will recognize that some components, such as the microphone 6 and speaker 8, are analog components while the CPU 40 and memory 42 are digital components. Thus, the bus 46 represents both the analog and digital interconnection of components. The operation of the cellular telephone 4 is well known in the art and thus will only be described in the context of the present invention.

The cellular telephone 4 communicates with the cell site controller 24 (see FIG. 1) using a control channel having a predetermined frequency for the cell site and a voice channel having a frequency designated by the cell site controller 24 for the particular call being placed. Initial communications between the cellular telephone 4 and the cell site controller 24 occur using only the control channel. The cellular telephone 4 transmits the stored ESN and MIN for the cellular telephone to the cell site controller 24 over the control channel. In addition, the dialed telephone number is also transmitted from the cellular telephone 4 to the cell site controller 24 over the control channel. Digital data using frequency-shift keying (FSK) of 10 Kbaud Manchester-encoded data is transmitted and received over the control channel.

Figure 3:
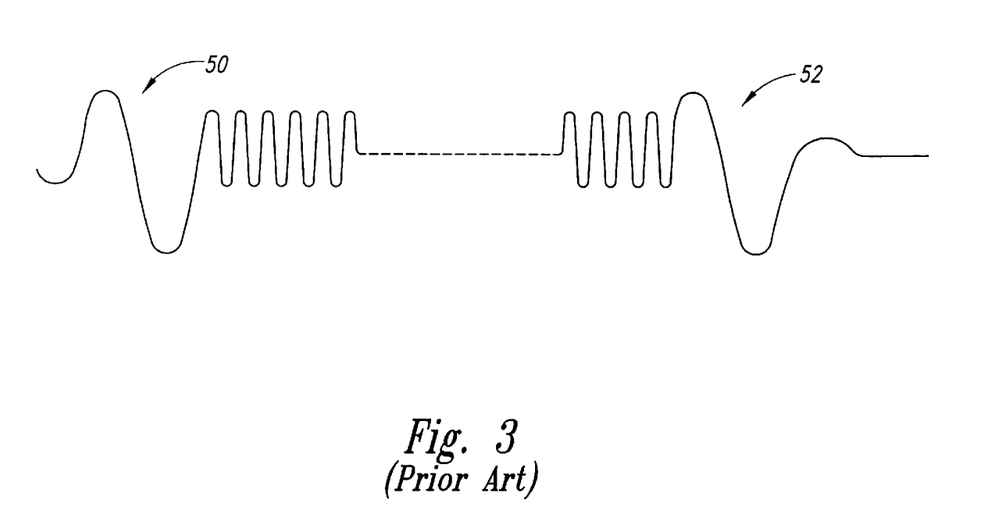
FIG. 3 is a waveform illustrating transmission characteristics of the transmitter of the cellular telephone of FIG. 2.

A typical waveform on the control channel is illustrated in FIG. 3. When the user first presses the "Send" button (not shown) on the keypad 10 (see FIG. 2), the transmitter 36 FSK modulates the data at the predetermined control frequency in the 800 MHz band. When the transmitter 36 is first activated, it must lock onto the appropriate radio frequency (RF) for a particular control channel. The process of locking onto the selected control channel frequency generates a turn-on transient 50. It should be noted that the waveform illustrated in FIG. 3 is not the RF signal itself, but rather an example of the demodulated output received at the cell site controller 24. In addition to the turn-on transient 50, the cellular telephone 4 generates a turn-off transient 52. The turn-off transient 52 results from the turn-off transient response of the transmitter 36 when transmission on the control channel is complete. The turn-on transient 50 and the turn-off transient 52, which are described in the Ferrell patent, are presented herein merely as examples of the transmission characteristics of an individual cellular telephone transmitter 36. Alternatively, the cell site controller 24 can analyze other transmission characteristics such as the transient response of the FSK data. Other reference waveforms are illustrated in the Rudokas patent and other references. These reference waveforms, which can be from any source of reference waveforms, are used to generate a fingerprint for the cellular telephone 4. The fingerprint is subsequently used to determine if the cellular telephone making a call is the authentic cellular telephone 4, or a fraudulent cellular telephone illegally transmitting an authentic ESN and MIN of the cellular telephone 4 of a valid subscriber.

The transmission characteristics, no matter how derived, are received at the cell site controller 24, processed and compared with a stored fingerprint for the cellular telephone 4. One such system for adaptively comparing waveforms is discussed in U.S. patent application No. 08/611,429, entitled "Adaptive Waveform Matching For Use In Transmitter Identification," filed on Mar. 6, 1996, which is incorporated herein by reference in its entirety. That system performs a real-time analysis of the transmission characteristic from the unauthenticated transmitter with the stored fingerprint. That system also provides the ability to update the fingerprint and is thus adaptive.

The present invention creates a customer call profile and uses the profile to designate an unauthenticated cellular telephone as a valid subscriber even though other identification techniques may have classified the unauthenticated cellular telephone as fraudulent. The customer call profile may be thought of as a "whorl" in the fingerprint that can be used to reduce the risk of false rejections. The present invention is embodied in a system 100 illustrated in the functional block diagram of FIG. 4, and is typically installed at and communicates with the cell site controller 24. The system 100 includes a receiver 102 which is coupled to the antenna 20. The signals received by the receiver 102 are coupled to a demodulator 104 which demodulates the received RF signal and produces FSK data. A central processing unit (CPU) 108 processes the received FSK data. Many of the processes described herein are performed by the CPU 108 using conventional programming techniques. The programming details are well known to those of ordinary skill in the art of computer programming and need not be described herein.

Figure 4:
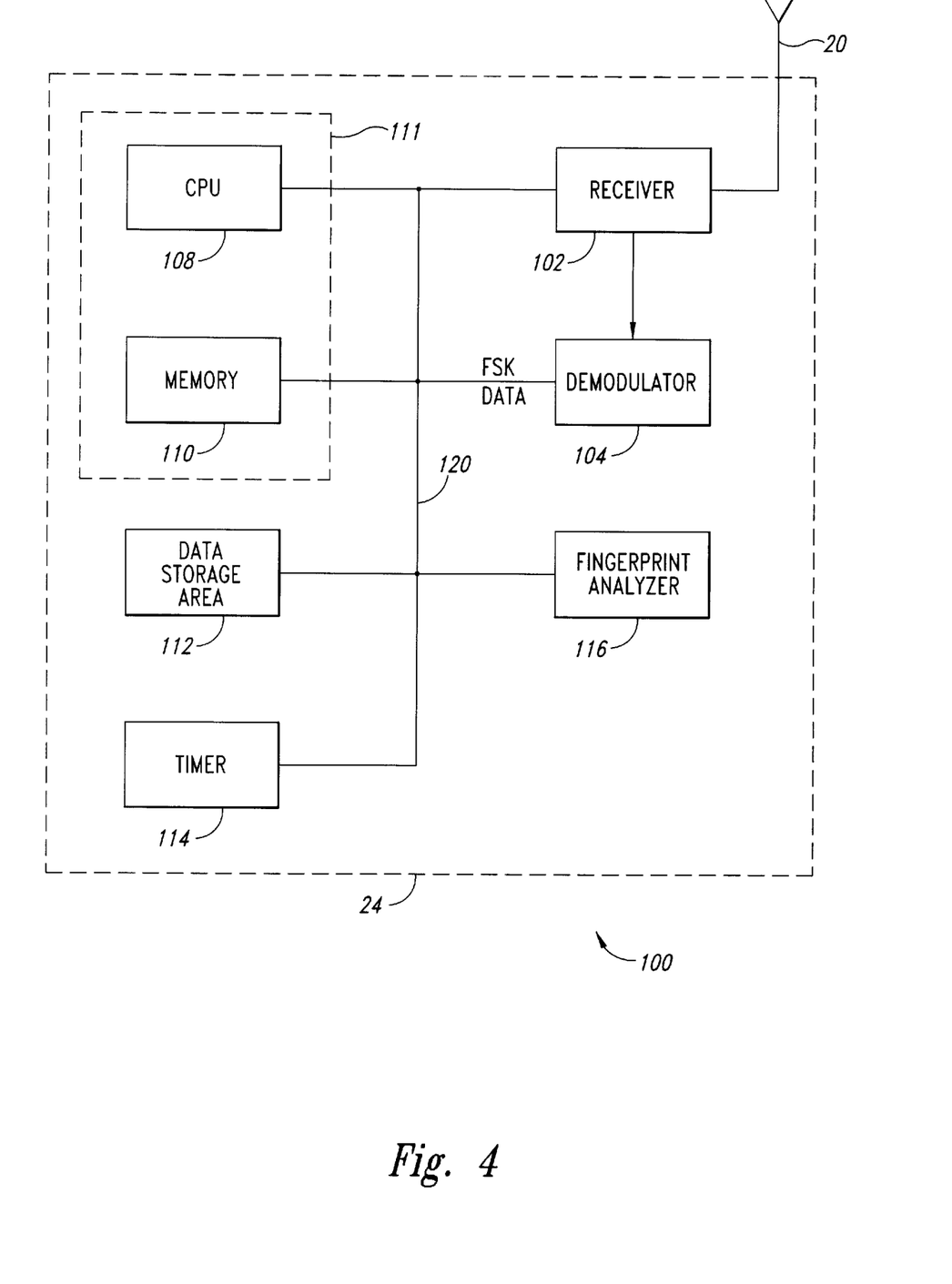
FIG. 4 is a functional block diagram of the system of the present invention.

The system 100 also includes a memory 110, which may include both random access memory (RAM) and read-only memory (ROM). The CPU 108, executing instructions from the memory 110 form a decision engine that will be used by the system 100 to designate an unauthenticated cellular telephone as authorized or fraudulent. The operation of the decision engine 111 will be discussed in detail below. A data storage area 112 is used to store data related to a plurality of calls from the cellular telephone 4 and calls to the cellular telephone. The data storage area 112 may be part of the memory 110, or a mass storage unit such as a hard disk drive or the like. The operation of the data storage area 112 will be described in detail below. A timer 114 is also used by the system 100 to determine the time and date at which data in the data storage area 112 was obtained from the cellular telephone 4.

The system 100 also includes a fingerprint analyzer 116 that performs a signature analysis of a transmission characteristic of the transmitter 36 (see FIG. 2) in the cellular telephone 4. As discussed above, any acceptable signature analysis technique will operate satisfactorily with the system 100. One example of a signature analysis technique is described in the above-identified U.S. patent application No. 08/611,429, entitled "Adaptive Waveform Matching for Use in Transmitter Identification." However, the scope of the present invention is not limited by the specific technique used to perform the analysis of the transmission characteristics. Rather, the present invention is directed to a technique for the analysis of data transmitted from an unauthenticated cellular telephone after the fingerprint analyzer 116 has determined that a cellular telephone is fraudulent.

The various components of the system 100 are coupled together by a bus 120 which may carry control signals and power in addition to data. Other components of the cell site controller 24, such as a power supply, transmitter, telephone switching network, and the like are conventional components that form no part of the present invention. For the sake of brevity, those conventional components of the cell site controller 24 are omitted from the present description.

As previously stated, a disadvantage of the fingerprint analyzer 116 is that it is not 100% effective. A telephone call from a fraudulent cellular telephone might normally be rejected as a fraudulent call if based solely on the analysis by the fingerprint analyzer 116. However, the present invention is directed to additional analysis techniques that can classify a particular call as valid even though the fingerprint analyzer 116 may have determined, perhaps correctly or incorrectly, that the cellular telephone making the call is fraudulent. As previously described, an unauthenticated cellular telephone is designated as authorized or fraudulent based on the analysis performed by the fingerprint analyzer 116. In addition to the fingerprint analysis of the transmitter 36 (see FIG. 2), the system 100 analyzes the cellular telephone call itself. For purposes of the present description, a particular telephone call is designated as a valid telephone call or a fraudulent telephone call. As will be described in detail below, the system 100 may designate a particular telephone call as valid even though the fingerprint analyzer 116 may have designated the cellular telephone making the call as fraudulent. This additional analysis is based on customer call profile data collected from a number of previous phone calls that have been determined to be from the authorized cellular telephone 4. The system 100, in effect, can overrule the results of the fingerprint analyzer 116 based on the customer call profile.

The system 100 collects data associated with calls from the cellular phone 4 and stores the associated data as calling activity parameters in the data storage area 112 to establish a customer call profile. It is important to note the calling activity parameter data is stored in the data storage area 112 only when the fingerprint analyzer 116 verifies the authenticity of the unauthenticated cellular telephone. In a presently preferred embodiment, data values for calling activity parameters such as the "call origin" and "time period" are recorded in the data storage area 112.

The call origin parameter refers to the physical location of the cellular telephone 4 in a particular cell site when a call is made from the cellular telephone. Whenever the user places a call, the unauthorized cellular telephone communicates with the cell site controller 24 in the manner described above. In addition, the cellular telephone 4 periodically communicates with the cell site controller 24 (see FIG. 1) whenever the cellular telephone is turned on, even though the user may not actively be operating the cellular telephone. Based on these communications, it is possible to determine the particular cell site controller 24 with which the cellular telephone 4 is communicating. If the fingerprint analyzer 116 determines that the present call is from the authorized cellular telephone 4, the call origin data value is stored in the data storage area 112 as a call origin parameter. For example, the user may operate the cellular telephone 4 in only one or two cells within a particular operating area. Thus, after an adequate database of call origin data values is established, the system 100 may designate a particular cellular telephone call as valid based on the call origin parameter even though the fingerprint analyzer 116 may have classified the cellular telephone making the call as fraudulent.

Another calling activity parameter used by the system 100 is a time period associated with calls from the cellular telephone 4. The system 100 divides the 24-hour period of a day into four separate time periods or slots, each of equal six hour lengths. If the fingerprint analyzer 116 has determined that the present call is from the authorized cellular telephone 4, the time period data associated with that call is stored in the data storage area 112 as a time period parameter. While the system 100 divides the day into four time periods, those of ordinary skill in the art will readily recognize that the day can be apportioned into any number of time periods. In addition, it is not necessary that the time periods be of equal length. For example, the system 100 may designate one time period to cover the time from midnight to 6 a.m., while the period from 6 a.m. to noon may be divided into more than one period. Thus, the present invention is not limited by the specific quantity or duration of time periods. If the user of the cellular telephone 4 places almost all calls between 6 a.m. and noon, after an adequate database of time period data is established, the system 100 can use the time period parameter to designate an unauthenticated cellular telephone as the authorized cellular telephone 4 even though the fingerprint analyzer 116 may have classified the unauthenticated cellular telephone as fraudulent.

The system 100 can use these parameters alone, or in combination. The system 100 advantageously provides an additional technique to designate a particular call as valid based on the customer call profile associated with the authorized cellular telephone 4 thus avoiding the inconvenience to the valid subscriber that results from a false determination by the fingerprint analyzer 116 that the cellular telephone was fraudulent when it was not.

The structure of the data storage area 112 will now be described in greater detail. The structure of the data storage area 112 is illustrated in Table 1 below:

TABLE 1

| Data Structure | |
|---|---|
| Max Sitename = 20 | |
| Sitename | [256] |
| Timeslot | [4] |
| Sitename | [i], Timeslot [j] |
| 1 | 1, 2 |
| 2 | 1, 2 |
| 3 | 1, 3 |
| 4 | 2, 2 |
| . | . |
| . | . |
| . | . |
| 128 | 1, 3 |
| 129 | 2, 3 |
| . | . |
| . | . |
| . | . |
| 256 | i, j | where Sitename is the call origin parameter described above and refers to the identification of the cell site controller 24 (see FIG. 1). Timeslot is the time period parameter described above and refers to the apportioned 24-hour period. Data values are entered sequentially into Table 1 starting at location 1 until 256 sets of data values are stored in the data storage area 112.

In the presently preferred embodiment, the system 100 tracks a maximum of 20 different sitenames. In a preferred embodiment, the system 100 can track calls from many cell sites, but retain data only from the 20 cell sites with the highest usage. For the sake of simplicity, these sitenames are illustrated in Table 1 by a single digit (e.g., sitename 1). However, in practice, the sitename is generally identified by a plurality of alphanumeric digits (e.g., Seattle1). Table 1 also illustrates four time slots, which are also identified by a single digit. With four time periods, time slot 1 corresponds to the time period from midnight to 6 a.m., time slot 2 corresponds to the time period from 6 a.m. to noon, time slot 3 corresponds with the time period from noon to 6 p.m., and time slot 4 corresponds to the time period from 6 p.m. to midnight. As discussed above, the system can readily accommodate a greater number of time periods and different start and cut-off times for the time periods. The system 100 collects up to 256 data values corresponding to each of the origin and time slot parameters. However, the system may include fewer or greater numbers of data values in the data storage area 112. In addition, the system 100 can operate before 256 sets of data values have been entered into the data storage area 112 and continue to add new sets of data values until 256 sets of data values have been stored.

When a subscriber first purchases the cellular telephone 4, the data storage area 112 contains no data associated with that particular cellular telephone. However, the system 100 will obtain the data values for the calling activity parameters and store these collected data values in the data storage area 112 over a period of time. The system 100 can also update the data values in the data storage area 112 to adapt to changing calling patterns for the cellular telephone 4. When the cellular telephone 4 is first used, the sitename data and time slot data for that particular call are entered into a first storage location in the data storage area 112 for that particular cellular telephone. As is known to those of ordinary skill in the art, the cellular telephone 4 transmits the MIN/ESN when calls are placed from the cellular telephone 4. The system 100 uses the transmitted ESN/MIN to idenfify the location of the data structure for the particular cellular telephone in the data storage area 112. If the fingerprint analyzer 116 determines that the unauthenticated cellular telephone is the authorized cellular telephone 4, the sitename data and time slot data are stored in a table in the data storage area 112 for that particular cellular telephone using the format of Table 1. The next call from the authorized cellular telephone 4 is also analyzed by the system, and the sitename and time slot data for that call is stored in location number 2 in the table in the data storage area 112 for that particular cellular telephone. The process continues over a period of time until there are 256 sitename and 256 corresponding time slot data values associated with the cellular telephone 4 to establish the customer call profile.

The system 100 can designate subsequent telephone calls as valid calls from the cellular telephone 4 based on the customer profile data in the table in the data storage area 112 even if the fingerprint analyzer 116 may have classified the unauthenticated cellular telephone as fraudulent. For example, the waveform illustrated in FIG. 3 may be transmitted by the authorized cellular telephone 4 while passing near sources of radio frequency interference, or structures, such as a tunnel, that may cause the fingerprint analyzer 116 to incorrectly classify the authorized cellular telephone 4 as fraudulent. If the fingerprint analyzer 116 has classified an unauthenticated cellular telephone as fraudulent, the decision engine 111 compares calling activity parameters for the present call by the unauthenticated cellular telephone to the historical customer call profile for the authorized cellular telephone 4, stored in the data storage area 112. Based on the comparison between the values of the calling activity parameters for the present call and the values of the calling activity parameters of the customer call profile stored in the data storage area 112 in association with the ESN/MIN for the authorized cellular telephone 4, the decision engine 111 will designate the phone call as valid if there is an adequate match. For example, if the system 100 determines from the call origin parameter and the time period parameter of the customer call profile stored in the data storage area 112 that the user makes 90% of his calls from a particular cell site, and, in a particular time slot, there is a significant likelihood that the present call is from the authorized cellular telephone 4 if the present call occurs in that same site and in that same time slot. Thus, the customer call profile can be used by the decision engine 111 to effectively override the decision of the fingerprint analyzer 116 based on other factors.

The system 100 locks or freezes the customer call profile after 256 sets of data values have been entered. In the presently preferred embodiment, the system 100 will not update the data in Table 1 for a period of one month after the customer call profile in the data storage area 112 has been frozen. After one month, the system 100 discards the oldest half of the data in Table 1 and renumbers the more recent half of the data entries. Thus, data entries 1–128 are deleted, while data entries 129–256 are renumbered as 1–128, respectively. The system 100 collects data for a new customer call profile for the cellular telephone 4 until the Table 1 in the data storage area 112 for the authorized cellular telephone 4 is again full. This process allows the system 100 to adapt to changes in customer calling patterns over time. When the Table 1 in the data storage area 112 is again full, the customer call profile is frozen for another month and the process is repeated.

To simplify the real-time analysis of subsequent cellular telephone calls, the system 100 creates a new data structure, illustrated below in Table 2 for use by the decision engine 111:

TABLE 2

| Cellsite | | Timeslot | | | |
|---|---|---|---|---|---|
| Sitename 1 | | [0] | [6] | [95] | [13] |
| Sitename 2 | | [3] | [6] | [47] | [11] |
| . | | | | | |
| . | | | | | |
| . | | | | | |
| Sitename i | | [ ] | [ ] | [ ] | [ ] |
| Total | [237] | | | | | where Sitename is the call origin parameter described above and refers to the identification of the cell site controller from cellsite 1 to cellsite i where i≦20. The four bracketed columns after each sitename indicate the number of calls in each of the timeslots for the corresponding site and Total is the total number of calls for all cellsites in Table 2. In the sample Table 2 shown above, a total of 237 calls out of a possible 256 calls are currently stored in Table 2. The data structure shown in Table 2 can be created and modified as each of the 256 data entries are collected or can be constructed after the 256 data entries have been completed and the customer profile frozen. The data in Table 2 is organized according to sitenames and the four time periods previously discussed. However, the system 100 can more readily access the customer call profile using the structure of Table 2, rather than scanning 256 records of Table 1 and tabulating the results. For example, Table 2 shows that for cell site Sitename 1, that 0 calls occurred between the hours of midnight and 6 a.m., 6 calls occurred between the hours of 6 a.m. and noon, 95 calls occurred between the hours of noon and 6 p.m., and 13 calls occurred between the hours of 6 p.m. and midnight. Thus, if an unauthenticated cellular telephone places a call at Sitename 1, during the hours of noon to 6 p.m., the decision engine 111 may designate the call as valid, regardless of whether the fingerprint analyzer 116 classified the unauthenticated cellular telephone as fraudulent. Thus, the system 100 advantageously provides customer call profile data in a simple format that can be readily analyzed, which reduces the possibility of incorrect rejection of a valid call.

The decision engine 111 may also calculate a confidence value associated with the analysis based on the data of Table 2 in the data storage area 112. In the example above, if 90% of the calls for a particular cellular telephone are from the same cell site and within the same time slot, there is a greater degree of confidence that a present call, having those same calling activity parameter values, is actually from the cellular telephone 4 compared with a customer call profile with a relatively uniform distribution over the four time slots and among 20 different cell sites. The operator of the cell site controller 24 (see FIG. 1) can select a confidence value at which the system 100 will override the decision of the fingerprint analyzer 116. In a preferred embodiment, the confidence value at which the system 100 will override the decision of the fingerprint analyzer 116 varies inversely with the degree to which the transmission characteristic of the unauthenticated transmitter 36 (see FIG. 2) of the unauthenticated cellular telephone matches the stored fingerprint. For example, the confidence value of the calling activity parameters can be set to a lower override threshold if there is a relatively close match between the transmission characteristic of the unauthenticated transmitter 36 and the stored fingerprint. In contrast, the system 100 can automatically increase the threshold of the confidence value at which the system overrides the fingerprint analyzer 116 if there is a poor match between the transmission characteristic of the unauthenticated transmitter 36 and the stored fingerprint. The fingerprint analyzer 116 also calculates a confidence value indicative of the degree of match between the transmission characteristic of the unauthenticated cellular telephone and the stored reference waveform. The decision engine 111 can designate a particular communication as valid or invalid/fraudulent based on the confidence values from the fingerprint analyzer 116 and the customer call profile confidence value calculated by the decision engine. In this way, the customer call profile is used in conjunction with fingerprint analysis to reduce the frequency of false rejections.

The system 100 compares the value stored in Table 2 for the cellsite and timeslot corresponding to the cellsite and timeslot of the present call to determine the number of matches between the present call and the customer call profile. For example, if the present call is made from the cellsite Sitename 1 between the hours of noon and 6 p.m. (Timeslot 3), the present call matches 95 calls in the customer call profile in the example Table 2 provided above. The confidence value may be readily determined by dividing the number of matches by Total, the total number of data entries in the Table 2 within the data storage area 112 for that particular cellular telephone. This is illustrated by the following equation:

$$C.V. = \frac{\text{number of matches}}{\text{Total}}$$

where C.V. equals the confidence value, the number of matches indicates the value in the Table 2 corresponding to the Sitename and Timeslot for the present call, and Total is the total number of data entries in the Table 2. In the example provided above, the confidence value C.V. for the time period parameter is 95/237 (i.e., a C.V.=0.401). In contrast, if the present call were placed in cellsite Sitename 1 between the hours of midnight and 6 a.m., the system 100 would calculate a confidence value of 0/237 (i.e., a C.V.=0.000). It should be understood that the system 100 can calculate separate confidence values for each of the call origin parameters and the time period parameter. The system 100 can also calculate the confidence value based on statistical data. For example, the system 100 can construct a probability density function using the time slots for a particular cell site and determine whether the present call is within one or more standard deviations of the probability density fumction for that cellsite. Other known forms of statistical analysis may also be used.

Figure 5A:
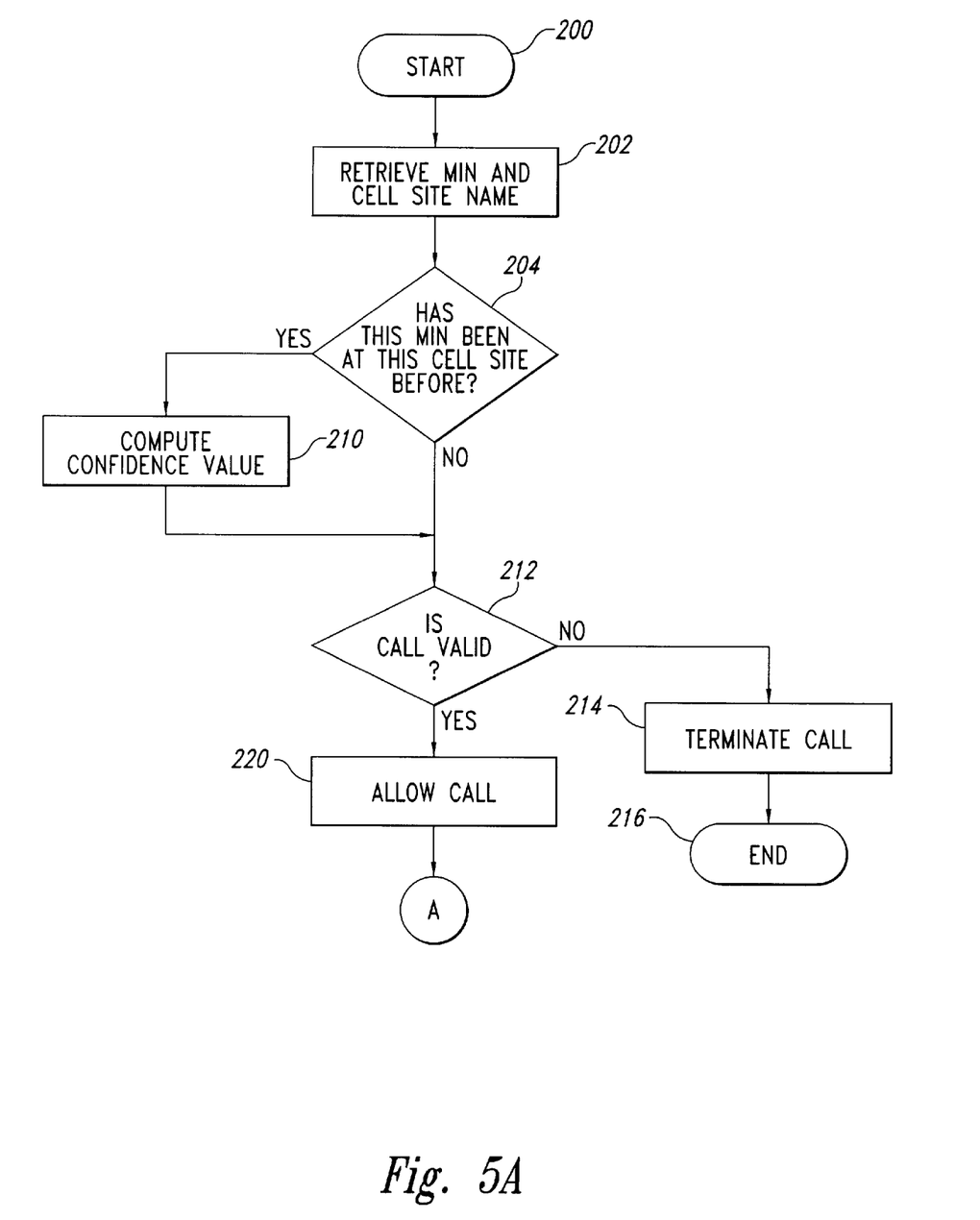
FIGS. 5A to 5C together comprise a flowchart of the operation of the inventive system of FIG. 4.
Figure 5B:
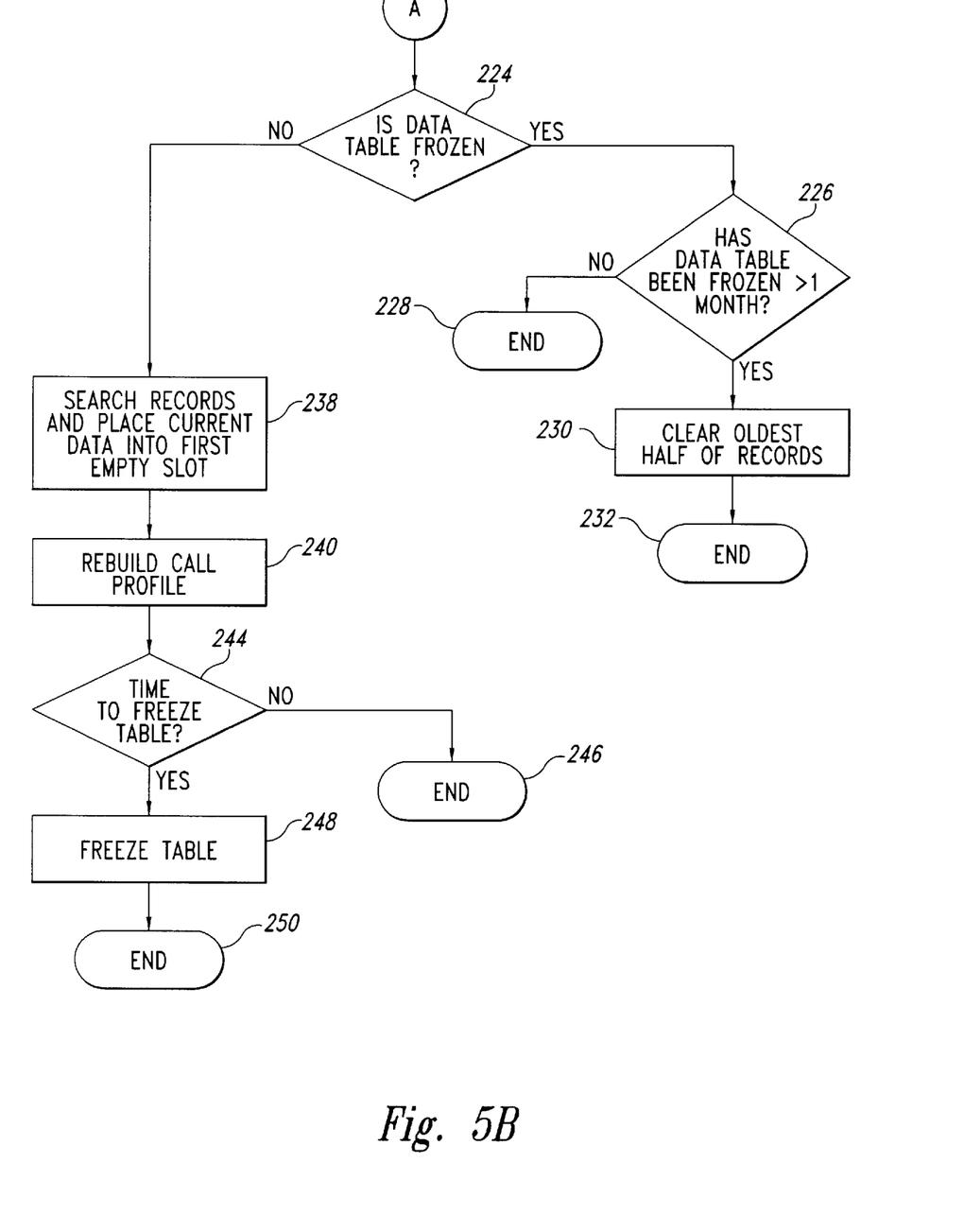
Figure 5C:
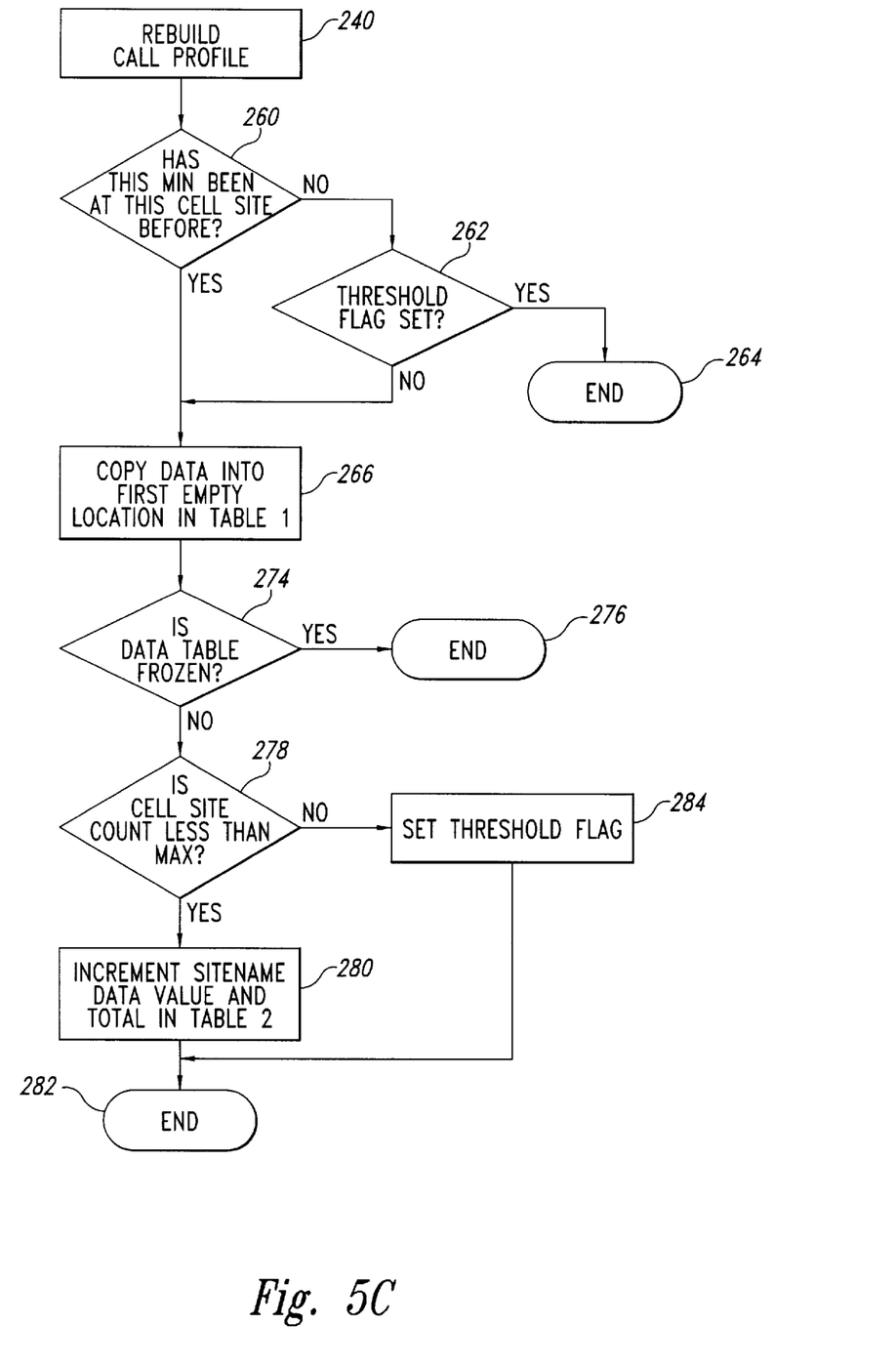

The operation of the system 100 is illustrated in the flowcharts of FIGS. 5A to 5C. At start 200, shown in FIG. 5A, the cell site controller 24 (see FIG. 1) is in communication with an unauthenticated cellular telephone. In step 202, the system 100 retrieves the ESN or MIN transmitted by the unauthenticated cellular telephone and the cell sitename with which the cellular telephone is communicating. In decision 204, the system determines whether the particular MIN has been in communication with the particular cell site controller 24 at a previous time. If the MIN has been seen at the particular cell site controller 24 at a previous time, the result of decision 204 is YES. In that event, the system 100 computes a confidence value in step 210. As previously discussed, the system may begin operation with less than the total of 256 sets of data values in the data storage area 112 (see FIG. 4). However, the user can select a minimum number of sets of data values that must be in the data storage area 112 before the system 100 can use the customer call profile as a basis for overriding the analysis of the fingerprint analyzer 116. For example, the user may determine that at least 128 sets of data values must be present in the data storage area to have a reliable customer profile. As previously discussed, the confidence value is related to the frequency with which the values of the calling activity parameters of the present call match the stored calling activity parameter values for that MIN. If the MIN has not been seen at the particular cell site controller 24 previously, the result of decision 204 is NO. In that case, the system 100 does not provide a confidence value to the decision engine. Alternatively, some default or minimum confidence value may be supplied to the decision engine.

If the result of decision 204 is NO, or following the computation of the confidence value in step 210, the decision engine 111 determines whether the call is valid in decision 212. It should be noted that the decision engine 111 (see FIG. 4) makes the determination of whether the call is valid based on a variety of factors. As previously discussed, those factors can include the output of the fingerprint analyzer 116, the use of the confidence value calculated in step 210 based on the customer call profile, or other factors not within the scope of this invention. For example, it is known to use valid dialed digits, indicative of a destination telephone number known to be validly used by the cellular telephone associated with the transmitted MIN, or known fraudulent digits, representing telephone numbers known to be associated with fraudulent cellular telephones, to allow or deny the present telephone call. If the present call is not valid, the result of decision 212 is NO. In that case, the system 100 terminates the present call in step 214 and ends the analysis in step 216. If the decision engine 111 determines that the present call is valid, the result of decision 212 is YES. In that event, the system 100 allows the present call to be processed by the cellsite controller 24 (see FIG. 1) in step 220.

In decision 224, shown in FIG. 5B, the system 100 determines whether the data in Table 2 is currently frozen. As previously discussed, the data in Table 2 is frozen when the maximum number of data entries (e.g., 256 data entries from a maximum of 20 cell sites) are entered into Table 2. If Table 2 is frozen, the result of decision 224 is YES. In that event, the system 100 moves to decision 226 where it determines whether Table 2 has been frozen for more than one month. If Table 2 has not been frozen for more than one month, the result of decision 226 is NO, and the system 100 ends the analysis at 228. If Table 2 has been frozen for more than one month, the result of decision 226 is YES. In that event, in step 230, the system 100 clears the oldest half of the records from the Table 1 data storage area 112 (see FIG. 4). After the oldest half of the records have been cleared from Table 1, the system 100 will begin to update the customer call profile by regenerating Table 2 and add new data to the data storage area 112. As previously discussed, the system 100 adds new data values to the data storage area 112 only if the fingerprint analyzer 116 has determined that the unauthenticated cellular telephone is the authorized cellular telephone 4. Following step 230, the system ends the analysis at 232.

If Table 2 is not frozen, the result of decision 224 is NO. In that event, the system 100 searches Table 1 and places the calling activity parameter values for the present call into the first available storage location in Table 1 in step 238. As previously discussed, the locations in Table 1 are labeled 1–256, with location 1 being the first or oldest record. If Table 2 is not frozen, at least one location in Table 1 will be available for the calling activity parameters for the present call.

In step 240, the system 100 rebuilds the customer call profile by regenerating Table 2. Step 240 comprises a number of steps, which will be discussed in greater detail in the flowchart of FIG. 5C. However, the basic operation performed in step 240 is the conversion of the data from the format illustrated above in Table 1 to the format illustrated in Table 2. As previously discussed, the real-time analysis performed by the system 100 utilizes data in the format of Table 2.

Following the rebuilding of the customer call profile in step 240, the system 100 moves to decision 244 where it determines whether it is time to freeze the Table 2. As previously discussed, the Table 2 is frozen when 256 total sets of data values have been stored. If there are not 256 sets of data values in the Table 1 in the data storage area 112, the result of decision 244 is NO. In that case, the system 100 ends the analysis at step 246, with Table 2 still being unfrozen, and capable of accepting additional data. If with the addition of the data for the present call there are now the maximum number of data entries in the table stored in the data storage area 112, the result of decision 244 is YES. In that case, the system 100 freezes Table 2 in step 248 and ends the analysis at step 250. At this point, the maximum number of sets of data entries have been stored, and the system 100 remains frozen for one month.

The process of rebuilding the customer call profile in step 240 is essentially a conversion from the format of Table 1 to that of Table 2. The steps are illustrated in the flowchart of FIG. 5C. The process of rebuilding the customer call profile begins at decision 260, where the system 100 determines whether the MIN of the present call has been previously processed by the particular cell site controller 24 (see FIG. 1) at a previous time. If the MIN has not been processed by this cell site before, the result of decision 260 is NO. In that event, the system determines whether a threshold flag has been set in decision 262. As will be discussed in greater detail, the threshold flag is used to indicate that sets of data entries have been received for the maximum number of cell sites (e.g., 20 cell sites). If the threshold flag has been set, the result of decision 262 is YES and the system 100 ends the analysis at step 264. If the threshold flag has not been set, the result of decision 262 is NO. In that case, in step 266, the system 100 copies the call activity parameter data from the present call into the first available location in Table 1 in the data storage area 112 if the fingerprint analyzer 116 has determined, as part of decision 212 in FIG. 5A, that the unauthenticated cellular telephone is the authorized cellular telephone 4.

If the particular MIN has been processed by at this cell site before, the result of decision 260 is YES. In that event, in step 266, the system 100 copies the calling activity parameter data from the present call into the first available location in Table 1 as described above.

Following the completion of step 266, the system 100 moves to decision 274 where it determines whether Table 2 is frozen. If Table 2 is frozen, the result of decision 274 is YES and the system 100 ends the analysis at step 276. If Table 2 is not frozen, the result of decision 274 is NO. In that event, in decision 278, the system determines whether the number of cell sites, labeled as a cell site count, is less than the maximum (e.g., less than 20). As previously discussed, the presently preferred embodiment collects data from a maximum of 20 cell sites. However, those of ordinary skill in the art will recognize that there may be greater or fewer number of cell sites set as the maximum number of cell sites. If the cell site count is less than the maximum, the result of decision 278 is YES. In that event, in step 280, the system 100 increments the data in Table 2 for the Sitename and Timeslot corresponding to the calling activity parameter data of the present call and the total, shown in Table 2. It should be noted that the system 100 will only use the calling activity parameter data from the present call if the fingerprint analyzer 116 (see FIG. 4) has classified the unauthenticated cellular telephone as the authorized cellular telephone 4, as part of decision 212 (see FIG. 5A). After the system 100 has updated the data of Table 2 in step 280, it ends the analysis at step 282.

If the cell site count is not less than the maximum, the result of decision 278 is NO. This result indicates that the maximum number of cell sites (e.g., 20 cell sites) has been reached. In that event, the system 100 sets the threshold flag in step 284 and ends the analysis at step 282.

Thus, the system 100 is capable of performing both fingerprint analysis on the transmission characteristics of the unauthenticated cellular telephone, but is also capable of using customer call profiles in an effort to reduce the number of erroneous rejections of valid calls. Furthermore, the system advantageously adapts to changes in the customer calling patterns over time by updating the customer call profile. While the present invention is discussed with respect to a small number of cell sites, it can be appreciated that the number of cell sites, as well as the number of data entries in Tables 1 and 2, can be altered to fit the particular needs of the service provider. Furthermore, it should be understood that the present invention is not limited to one geographic area. For example, if a customer routinely travels between two cities, such as Seattle and Los Angeles, the system 100 can establish a customer call profile based on use within the cell sites of these two diverse geographical areas. In this embodiment, it is necessary that the data storage area 112 be accessible to the cell site controller 24 in Seattle and Los Angeles. However, it is within the known art to provide high speed data links between different geographical regions, so that the data storage area 112 may be located in one area and accessible to cell site controllers throughout the country. Alternatively, the system 100 may establish the customer call profile in the manner described above, and transmit the customer call profile to the data storage area 112 at each cell site controller throughout the country. Thus, it should be clear that the present invention is not limited by the specific location of the data storage area 112, nor is it limited to the maximum number of cell sites and data entries described in the examples above.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the detection of wireless telephone fraud, the system comprising:

a signature analyzer to classify an unauthenticated wireless telephone as authorized or fraudulent based on a transmission characteristic of said unauthenticated wireless telephone in a communication with said unauthenticated wireless telephone;

an origin data storage area to store data related to a place of origin of a particular wireless telephone for each of a plurality of different communications with said particular wireless telephone classified by said signature analyzer as said authorized wireless telephone;

a timer to determine a time period associated with each of said plurality of different communications with said authorized wireless telephone;

a time storage area to store said time period in association with each of said plurality of different communications; and a decision engine to analyze a communication with an unauthenticated wireless telephone classified by said signature analyzer as said fraudulent wireless telephone at a time subsequent to said plurality of different communications with said authorized wireless telephone, said decision engine designating said subsequent communication as valid regardless of whether said signature analyzer identified said unauthenticated wireless telephone as said fraudulent wireless telephone if a place of origin of said subsequent communication matches one of said places of origin in said origin data storage area and if a time period of said subsequent communication matches one of said time periods in said time storage area.

2. A system for the processing of wireless telephone communications, the system comprising:

a signature analyzer to classify an unauthenticated wireless telephone as authorized or fraudulent based on a transmission characteristic associated with said unauthenticated wireless telephone;

a parameter data storage area to store data for one or more parameters which are unrelated to transmission characteristics and which are associated with each of a plurality of different communications with a particular wireless telephone classified by said signature analyzer as an authorized wireless telephone;

a data storage area to store data for one or more corresponding parameters associated with a subsequent communication with an unauthenticated wireless telephone at a time subsequent to said plurality of different communications with said authorized wireless telephone; and a decision engine to analyze said subsequent communication with said unauthenticated wireless telephone classified by said signature analyzer as fraudulent, said decision engine designating said subsequent communication as valid based on said data for one or more stored parameters and said data for one or more corresponding parameters irrespective of the classification by said signature analyzer to thereby reduce false rejections by said signature analyzer.

3. A system for the processing of wireless telephone communications, the system comprising:

a signature analyzer to classify an unauthenticated wireless telephone as authorized or fraudulent based on a transmission characteristic of said unauthenticated wireless telephone in a communication with said unauthenticated wireless telephone;

a parameter data storage area to store data for one or more parameters associated with each of a plurality of different communications with a particular wireless telephone classified by said signature analyzer as an authorized wireless telephone, said parameter data storage area also storing data for one or more corresponding parameters associated with a communication with an unauthenticated wireless telephone at a time subsequent to said plurality of different communications with said authorized wireless telephone; and a decision engine to analyze said subsequent communication with said unauthenticated wireless telephone classified by said signature analyzer as fraudulent, said decision engine designating said subsequent communication as valid based on said signature analyzer classification, said data for one or more parameters, and said data for one or more corresponding parameters.

4. The system of claim 3 wherein a place of origin of said authorized wireless telephone during each of said plurality of different communications is stored in said parameter data storage area as said data for one of said one or more parameters associated with said authorized wireless telephone, said decision engine designating said subsequent communication as valid based on a place of origin of said unauthenticated wireless telephone during said subsequent communication matching said stored place of origin data.

5. The system of claim 4 for use with a cellular telephone system having a plurality of cells, said place of origin of said plurality of different communications with said authorized wireless telephone in said parameter data storage area being cell identifiers of cells within said cellular telephone system, said decision engine designating said subsequent communication as valid based on a place of origin of said unauthenticated wireless telephone in a cell during said subsequent communication matching one of said cell identifiers in said origin data storage area.

6. The system of claim 3, further including a timer to determine a time period associated with each of said plurality of different communications with said authorized wireless telephone, said time period of each of said plurality of different communications being stored in said parameter data storage area as said data for one of said one or more parameters associated with said authorized wireless telephone, said decision engine designating said subsequent communication as valid based on a time period of said subsequent communication matching said stored time periods.

7. The system of claim 6 wherein each of said time periods corresponds to a prescribed portion of a day, said time period associated with each of a plurality of different communications and said time period of said subsequent communication being ones of said apportioned time periods.

8. The system of claim 3 wherein said decision engine calculates a confidence value for said subsequent communication with said unauthenticated wireless telephone and designates said subsequent communication as valid based on said signature analyzer classification and said confidence value.

9. The system of claim 8 wherein said decision engine designates said subsequent communication as valid if said calculated confidence values exceeds a predetermined threshold value.

10. The system of claim 9 wherein said signature analyzer calculates a confidence value indicative of a confidence with which said unauthenticated wireless telephone has been classified as said fraudulent wireless telephone, said predetermined threshold value being based on said signature analyzer confidence value.

11. The system of claim 10 wherein said predetermined threshold value varies in an inverse manner with said signature analyzer confidence value.

12. The system of claim 8 wherein said confidence value is calculated by determining a frequency with which said data for one or more parameters matches said corresponding data for said one or more parameters.

13. The system of claim 8 wherein said confidence value is based on a statistical analysis of said data for said stored parameters associated with said authorized wireless telephone and said corresponding data associated with said unauthenticated wireless telephone.

14. The system of claim 3 wherein said data associated with said authorized wireless telephone are at least partially periodically updated to store new data for said one or more parameters associated with said authorized wireless telephone, said decision engine also designating said subsequent communication as valid based on said new data for said one or more parameters.

15. The system of claim 14 wherein said decision engine can designate said subsequent communication as valid only if said parameter data storage area has a predetermined minimum number of stored values for said one or more parameters associated with said authorized wireless telephone.

16. The system of claim 14 wherein said parameter data storage area has a predetermined maximum number of data values and a predetermined number less than said maximum number of data values are periodically deleted from said parameter data storage area to periodically update said parameter data storage area with said new data for said one or more parameters associated with said authorized wireless telephone.

17. The system of claim 16 wherein said data associated with each of a plurality of different communications are sequentially stored in said parameter data storage area according to a time of each of said plurality of communications and said deleted data values are the oldest values based on said sequential data storage.

18. A system for the processing of wireless telephone communications, the system comprising:
a signature analyzer to classify an unauthenticated wireless telephone as authorized or fraudulent based on a transmission characteristic of said unauthenticated wireless telephone in a communication with said unauthenticated wireless telephone;
a data storage area to store customer profile data associated with a plurality of different communications with a particular wireless telephone classified by said signature analyzer as an authorized wireless telephone; and
a decision engine to analyze a subsequent communication with an unauthenticated wireless telephone at a time subsequent to said plurality of different communications with said authorized wireless telephone when said unauthenticated wireless telephone in said subsequent communication has been classified as fraudulent by said signature analyzer, said decision engine alternatively designating said subsequent communication as valid or invalid based on said customer profile data.

19. The system of claim 18, further including a timer to determine a time period associated with each of said plurality of different communications with said authorized wireless telephone, said customer profile data including said time period and a place of origin of said authorized wireless telephone during each of said plurality of different communications.

20. The system of claim 18 wherein said decision engine uses said customer profile data to calculate a confidence value for said subsequent communication with said unauthenticated wireless telephone and designates said subsequent communication as valid or invalid based on said signature analyzer classification and said confidence value.

21. The system of claim 20 wherein said decision engine designates said subsequent communication as valid if said calculated confidence values exceeds a predetermined threshold value.

22. The system of claim 21 wherein said signature analyzer calculates a confidence value indicative of a confidence with which said unauthenticated wireless telephone has been classified as authorized or fraudulent, said predetermined threshold value being based on said signature analyzer confidence value.

23. The system of claim 22 wherein said predetermined threshold value varies in an inverse manner with said signature analyzer confidence value.

24. The system of claim 20 wherein said confidence value is calculated by determining a frequency with which said subsequent communication matches said customer profile data.

25. A method for the processing of wireless telephone communications, the method comprising:
classifying an unauthenticated wireless telephone as authorized or fraudulent based on a transmission characteristic of said unauthenticated wireless telephone;
storing customer profile data associated with a plurality of different communications with a particular wireless telephone classified as an authorized wireless telephone;
classifying a subsequent communication with an unauthenticated wireless telephone at a time subsequent to said plurality of different communications with said authorized wireless telephone to designate said unauthenticated wireless telephone as fraudulent based on said transmission characteristic of said unauthenticated wireless telephone during said subsequent communication; and
analyzing said subsequent communication and designating said subsequent communication with said unauthenticated wireless telephone as valid or invalid based on said customer profile data irrespective of said classification of said wireless telephone as fraudulent based on said transmission characteristic of said wireless telephone during said subsequent communication.

26. The method of claim 25, further including the steps of determining a time period associated with each of said plurality of different communications with said authorized wireless telephone and determining a place of origin of said authorized wireless telephone during each of said plurality of different communications, said customer profile data including said time period and said place of origin for each of said plurality of different communications.

27. The method of claim 25 wherein said step of analyzing uses said customer profile data to calculate a confidence value for said subsequent communication with said unauthenticated wireless telephone and designates said subsequent communication as valid or invalid based on said classification and said confidence value.

28. The method of claim 27 wherein said step of analyzing designates said subsequent communication as valid if said calculated confidence values exceeds a predetermined threshold value.

29. The method of claim 27 wherein said step of classifying calculates a confidence value indicative of a confidence with which said unauthenticated wireless telephone has been classified as authorized or fraudulent, said predetermined threshold value being based on said confidence value calculated by said step of classifing.

30. The method of claim 29 wherein said predetermined threshold value varies in an inverse manner with said confidence value calculated by said step of classifying.

31. The method of claim 27 wherein said confidence value is calculated by determining a frequency with which said subsequent communication matches said customer profile data.

32. A method for the processing of wireless telephone calls, the method comprising:

storing customer profile data associated with a plurality of different calls with a particular wireless telephone that has been classified as an authorized wireless telephone in each of said plurality of different calls based on a transmission characteristic of said particular wireless telephone in each of said plurality of different calls;

classifying a subsequent call with an unauthenticated wireless telephone at a time subsequent to said plurality of different calls with said authorized wireless telephone to designate said unauthenticated wireless telephone as fraudulent based on said transmission characteristic of said unauthenticated wireless telephone during said subsequent call; and analyzing said subsequent call with respect to said customer profile data and overriding said fraudulent classification to classify said unauthenticated wireless telephone as said authorized wireless telephone irrespective of said classification of said wireless telephone as fraudulent based on said transmission characteristic of said wireless telephone during said subsequent communication.

* * * * *